United States Patent [19]

Nezu et al.

[11] Patent Number: 4,617,578
[45] Date of Patent: Oct. 14, 1986

[54] MULTI-BEAM ZOOM AND FOCUSING LENS SCAN PITCH-ADJUSTING RECORDER

[75] Inventors: Yasutada Nezu; Yutaka Tamura; Yuuzi Mizuno; Hiroshi Iwamoto; Akihiro Yokota, all of Kyoto; Kiyoshi Maeda, Osaka, all of Japan

[73] Assignee: Dainippon Screen Mfg. Co., Ltd., Japan

[21] Appl. No.: 699,159

[22] Filed: Feb. 7, 1985

[30] Foreign Application Priority Data

Feb. 15, 1984 [JP] Japan ............................ 59-25155
Feb. 17, 1984 [JP] Japan ............................ 59-27339

[51] Int. Cl.$^4$ .............. G01D 9/42; G02B 27/17; B41B 13/00; H04N 1/40
[52] U.S. Cl. ....................... 346/108; 346/107 R; 346/76 L; 350/6.1; 350/6.8; 350/445; 354/5; 358/302
[58] Field of Search ........... 346/107 R, 108, 76 L; 350/6.1, 6.8, 445; 354/5; 358/302

[56] References Cited

U.S. PATENT DOCUMENTS 4,353,617 10/1982 Tokumitsu et al. ............ 350/6.8
4,390,235 6/1983 Minoura ........................ 350/6.1
4,455,065 6/1984 Niwa et al. ..................... 350/445

Primary Examiner—E. A. Goldberg
Assistant Examiner—Gerald E. Preston
Attorney, Agent, or Firm—Poms, Smith, Lande & Rose

[57] ABSTRACT

A method for recording a plurality of reproduction picture images of an original picture in which multiple laser beams modulated by an acoustic-optical modulator according to picture signals obtained by scanning the original picture in a scanning image reproduction system and an apparatus for carrying out the above described method. Particularly in the invention there is disclosed a means for adjusting mutual distance between each of the plurality of parallel laser beams in response to desired scanning line pitches.

10 Claims, 3 Drawing Figures

MULTI-BEAM ZOOM AND FOCUSING LENS SCAN PITCH-ADJUSTING RECORDER

BACKGROUND OF THE INVENTION

The present invention relates to a method and a device for recording a plurality of reproduction picture images of an original picture by applying multiple laser beams modulated by picture signals obtained by scanning the original picture in a scanning image reproduction system, particularly to a means for adjusting mutual distance between each of a plurality of parallel laser beams in response to desired scanning line pitches.

PRIOR ART

There is a disclosure regarding a method for adjusting mutual distance between each of a plurality of parallel laser beams without varying each of diameters of lighting points projected by the respective laser beams in the Japanese Patent Laid-open Publication No. 52-12370 (the corresponding appication of British Patent Application No. 8518/76). In the invention disclosed in the prior publication there are provided a mask having apertures of the number corresponding to each of the laser beams and a combined prism (Dobe prism) for adjusting longitudinal pitches by varying angles of the projected lighting points by rotating each of the parallel laser beams about an optical axis. However, in the method disclosed in this prior publication it is required to comprise a mask, a combind prism and a control means therefor etc., which results in requiring a large scaled and complicate construction.

SUMMARY OF THE INVENTION

It is one object of the present invention to provide an improved method and an apparatus for adjusting mutual distance between each of a plurality of parallel laser beams.

It is the other object of the present invention to provide a novel and simple recording device comprising a beam compressor which uses a zoom lens for adjusting pitches of the laser beams in a scanning image reproduction system.

According to the present invention, the recording device is adapted so that a plurality of parallel laser beams may be converted to those parallel laser beams each of pitches between which is reduced by an optical system comprising two lenses which hold a common convergent point of the laser beams, and after then the parallel laser beams are projected by a focusng lens onto the surface of a photographic film positioned in the vicinity of the focusing plane of the lens.

These and other objects and advantages of the present invention will be clarified by referring to the following accompanying drawings, that;

DETAILED DESCRIPTION OF THE PREFERRED EMBODIMENT

Figure 1:
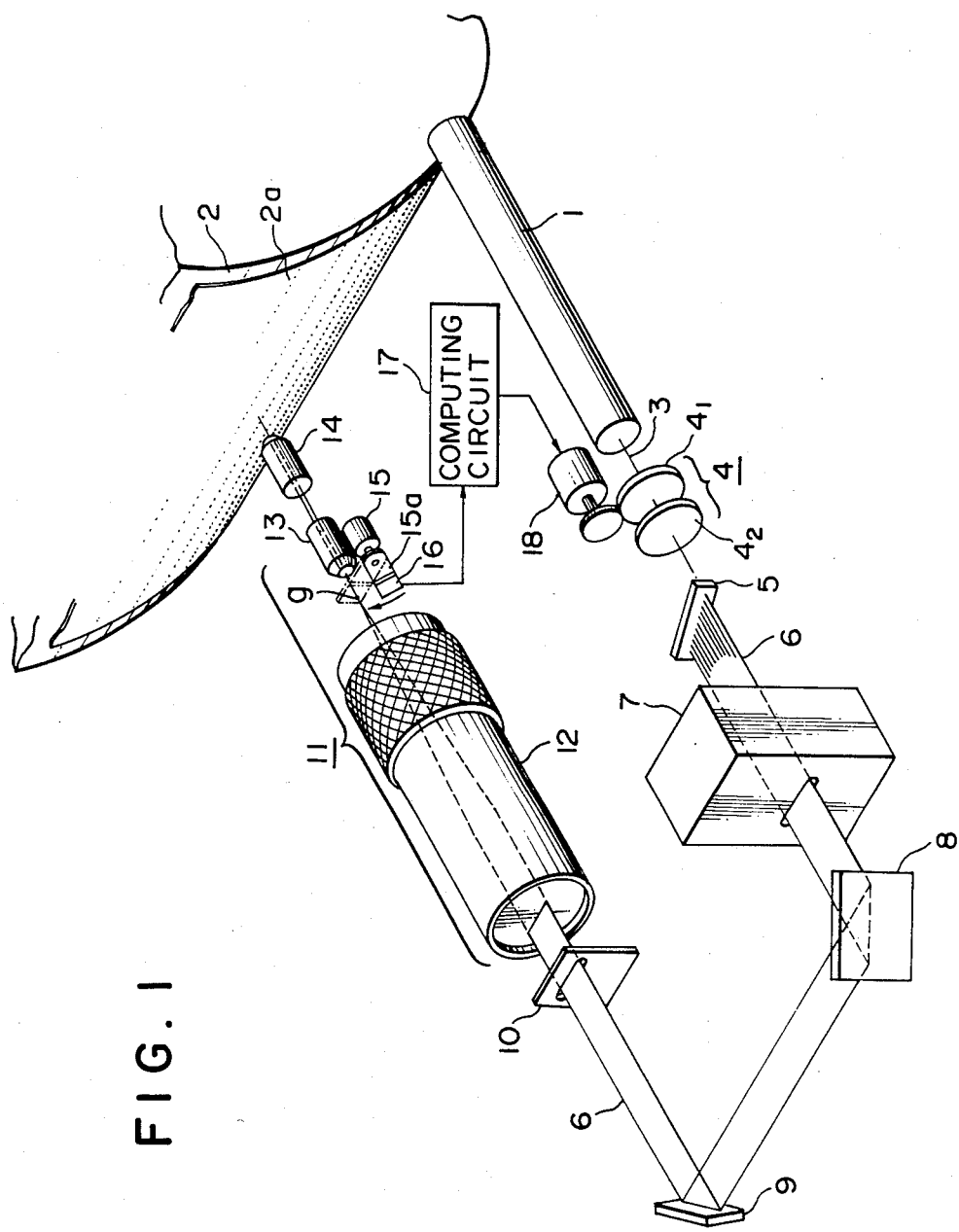
FIG. 1 is a schematic perspective view of a preferred embodiment of a recording device in an image scanning apparatus according to the present invention.

In FIG. 1 a laser beam 3 emitted from a laser source is converted an appropriate form so as to be able to apply to any usages thereof by each of elements which will be described hereinafter, then it is emitted onto a photographic film (photosensitive material) 2a stuck on a recording device 2 in an image scanning system.

After the intensity of radiation of the laser beam 3 has been adjusted by an intensity controller 4 description will be given hereinafter, the laser beam 3 is separated into a plurality of parallel beams 6 by a beam splitter 5. As the beam splitter 5, for example, publicly well known one such as disclosed in the Japanese Patent Laid-Open Publication No. 52-122135 (the corresponding British Patent Application No. 8517/76 Crosfield Electronics) may be applied. The beam splitter 5 is a glass block having a pair of parallel opposite surfaces, one of them is coated so that it may form a complete reflecting plane, and the other of them is coated so that transmission coefficient may be varied stepwisely to make intensity of radiation of a plurality of light beams emitting from the plane uniform.

A plurality of the parallel laser beams 6 emitted from the beam splitter 5 are then transmitted to a multi-channel type acoustic-optical modulator 7. The acoustic-optical modulator 7 has, as disclosed in the Japanese Patent Laid-Open Publication No. 58-10742 and the Japanese Patent publicaion No. 58-14135 (the correspnding foreign applications are U.S. patent application Ser. No. 395,436; British Patent Application No. 20,316/86; German Patent Application P 32 26 208.6; and French Patent Application No. 82 12,204) filed by the Applicant, a plurality of supersonic exciters being arranged on a single acoustic-optical medium, and modulates each of the laser beams independently by radiating each of a plurality of the laser beam according to picture signals.

Figure 3:
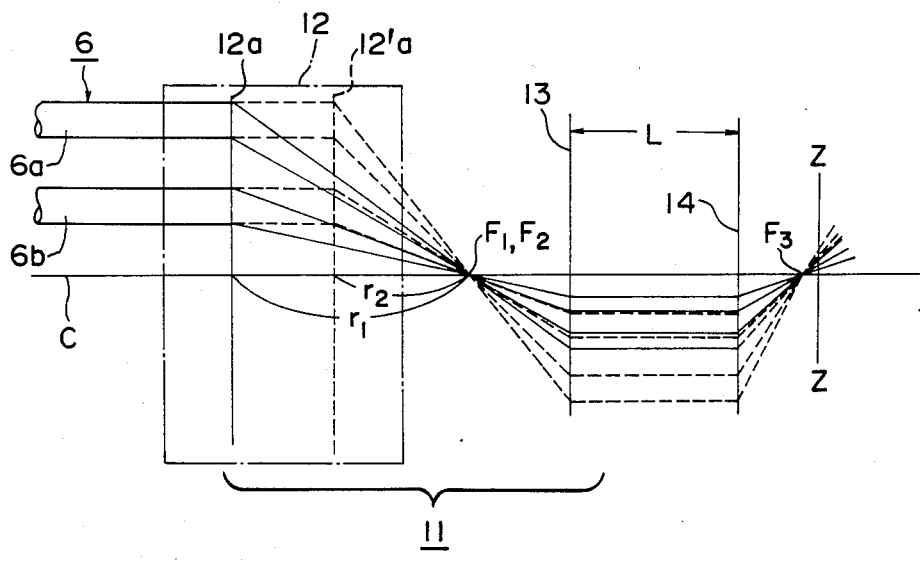
FIG. 3 is an explanatory diagramatical view of the principle of the present invention.

A plurality of the laser beams 6 modulated by the modulator 7 are sequentially reflected by two mirrors 8 and 9 and zero dimension diffraction generated when the laser beams 6 were modulated by the modulator 7 is separated to be eliminated with a slit 10. Thus, only the first dimension diffraction is incident to a beam compressor 11. The beam compressor 11 changes each of pitches between the respective plurality of parallel laser beams 6 as desired. That is, as shown in FIG. 3, the beam compressor 11 is composed of a zoom lens 12 the principal point of which is indicated as 12a and a convex lens 13. Passages of light beams incident in the beam compressor 11 are formed as shown in FIG. 3, so that each of the pitches between the respective parallel laser beams 6 can be varied continuously. That is, the plural parallel beams 6a, 6b, ... incident in the zoom lens 12 as shown in FIG. 3 are condensed into an optical axis between the zoom lens 12 and the convex lens 13 disposed so that they have common focuses F1 and F2, and from the focus F2 those beams are projected onto the convex lens 13, then again they are radiated in parallel. However, each of pitches between these plurality of parallel beams and each of diameters of those beams are converted to the respective pitches and diameters of the beams 6a, 6b, ... which are projected onto the zoom lens 12.

Figure 2:
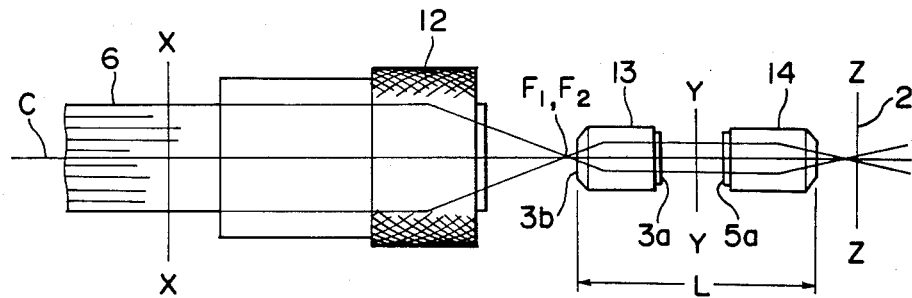
FIG. 2 is a simplified plane view of the same embodiment.

That is, the beam compressor 11 comprised of the zoom lens 12 and the convex lens 13, can vary the plurality of incident laser beams (X—X in FIG. 2) and each of pitches between these radiated laser beams (Y—Y in FIG. 2) and these diameters of the beams. By moving the principal point of the zoom lens 12 from 12a to 12a', each of the pitches between the respective laser beams 6 and those diameters of the beams can be freely adjusted. For example, in the case of the principal point being at the point 12a, i.e., when focal length is r1, each of the beams passes respective optical passages shown with solid lines in FIG. 3, and in the case of the principal point 12'a being moved, that is, focal length being r2 which is shorter than the focal length r1, each of those beams passes respective optical passages shown in doted lines. Further, when the principal point is set at 12a, each of pitches between respective beams and diameters thereof are smaller than those of the principal point being set at the point 12'a. By setting the principal point of the zoom lens 12 at a desired position between the points 12a and 12'a, desired values of pitches and diameters can be freely selected.

As described the above, the converted plurality of parallel laser beams are incident into a focussing lens 14 of the next stage to project onto the surface of the photosensitive material 2a stuck on the outer surface of the recording drum 2. Distance between the focussing lens 14 and the photosensitive material 2a is desired nearly equal to the focal length of the focussing lens 14, and it is preferable to coincide the distance to a position at which diameters of the laser beams become to the smallest ones. However, it is not strictly required to coincide the position therewith, but any positions in the vicinity of the focus of the focussing lens 14 or a beam waist at where no optical interferent effect is generated may be available.

As described the above, in an optical system comprised the beam compressor 11 and the focussing lens 14, effective F value for the laser beams is large, so that spot size of focussed beam is not too small, and it is radiated with a lower reduction ratio than those of pitchs between the respective beams which results in narrowing each of the distances between respective lighting points.

Referring to the embodiment shown in FIG. 1, between the zoom lens 12 and the convex lens there is provided a rotary solenoid 15 which drives a shutter 15a so that it let a photocell 16 secured thereto go in and out of the beam waist position ( F1, F2 in FIG. 3) of each of the laser beams. The photocell 16 generates a light detecting signal which controls the intensity controller 4 comprising of a pair of polarizing plates 4 and 4 to adjust intensity of the laser beams 6 to a prdetermined value for compensating for lacking in intensity of light being caused in the case of a scanning line pitch being large in recording, and is applied to adjust diameters of light points radiated to a photosensitive material 20.

As laser beam has a polarized plane, the intensity controller 4 controls intensity of radiation of laser beam by utilization a fact that there is a constant relation between rotational angle of the polarizing plate 4 and intensity of laser beam transmitting therethrough. The relation between the rotational angle of the polarizing plate 4 and intensity of transmitting laser beam is stored in a memory means incorporated in a computing circuit 17 previously. The intensity controller 4 is adapted to obtain desired transmitting light intensity by rotating the polarizing plate 4 by means of a pulse motor 18 driven in accordance with a rotational angle value which is obtained by calculating a rotational angle of the polarizing plate 4 which corresponds to a desired light intensity basing on output data from the computing circuit 17 in response to a signal from the photocell 16.

However, in thus obtained desired transmitting light intensity, if it is remained as it stands, the polarized plane of the transmitting laser beam varies to fluctuate efficiency of modulation in an AOM (acoustic-optical modulator) element of the later stage, so that the other polarizing plate 4 is provided to correct the polarized plane of the laser beam.

As described the present invention by basing upon the embodiments shown in the drawings, in short, the gist of present invention lies in achieving that a plurality of parallel laser beams are incident into a beam compressor of a type of utilizing a zoom lens, each of pitches between the respective laser beams is adjusted to a desired value by regulating the principal point of the zoom lens and further each of pitches between lighting points which are focussed in the vicinity of focusing point of a focussing lens can be adjusted.

What is claimed is:

1. A method for exposing a photographic film by a plurality of modulated laser beams in a scanning image reproduction system, characterized by comprising the following steps of:
   modulating a plurality of parallel laser beams independently basing on picture image signals;
   converting said plurality of modulated laser beams to a plurality of laser beams each pitch between which is compressed by a beam compressing optical system comprising two lenses which hold convergent points of said laser beams in common; and
   focussing said compressed laser beams as a plurality of lines of light points having a predetermined interval between each of them on the surface of recording material placed in the vicinity of the focussing point of said focussing lens.

2. A method as defined in claim 1, wherein focussing length of one of said two lenses holding the convergent points in common is varied.

3. A method as defined in claim 2, wherein said one of the two lenses is a zoom lens of which convergent point always coincides with that of the other lens.

4. An apparatus for exposing a photographic film by a plurality of modulated laser beams in a scanning image reproduction system, characterized by comprising:
   a laser source for generating laser beam;
   an intensity adjusting means for controlling intensity of said laser beam according to a signal coming from a light receiving element which detects intensity of light and is disposed on an optical axis at the latter stage;
   a beam splitter for separating said intensity adjusted laser beam into a plurality of beams;
   a multiple type AOM (acoustic-optical modulator) element for modulating each of said plurality of separated laser beams independently;
   a beam compressor for adjusting each of pitches between said modulated laser beams which are projected thereto; and
   a focussing lens which condenses each of said laser beams being incident thereto from said beam compressor and projects a plurality of minute light points onto a recording material.

5. An apparatus as defined in claim 4, wherein said beam compressor comprises a zoom lens and a convex lens which holds common focus with that of said zoom lens.

6. An apparatus for exposing a photographic film by a plurality of modulated laser beams in a scanning image reproduction system, comprising:

a laser source for generating laser beam;

means for controlling the intensity of said laser beam;

beam splitter means for separating the intensity adjusted laser beams into a plurality of beams;

means for modulating each of said plurality of separated laser beams independently;

a beam compressor means including a zoom lens for adjusting the pitch or spacing between said modulated laser beams; and a focusing lens means for receiving said beams from said beams compressor means and for projecting the resultant plurality of minute light points onto a recording material, with the spacing between said points being varied in proportion to the adjustable spacing between said beams.

7. An apparatus as defined in claim 4, wherein said beam compressor means comprises a zoom lens and a convex lens which holds common focus with that of said zoom lens.

8. An apparatus as defined in claim 6 wherein said modulating means is a multiple type acoustic-optical modulator.

9. An apparatus as defined in claim 6 wherein said intensity controlling means includes sensor means for measuring the light intensity and means responsive to the output of said sensor of automatically varying the intensity of the original laser beam.

10. An apparatus as defined in claim 5 further comprising recording means for receiving and recording images provided by said plurality of beams, and means including said zoom lens for varying the spacing of the images of said beams on said recording means by changing the focal length of said zoom lens.

* * * * *